US012712758B2

(12) United States Patent
Maruyama

(10) Patent No.: US 12,712,758 B2
(45) Date of Patent: Aug. 18, 2026

(54) VEHICLE CONTROL SYSTEM

(71) Applicant: Koito Manufacturing Co., Ltd., Tokyo (JP)

(72) Inventor: Yuta Maruyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 293 days.

(21) Appl. No.: 18/539,515

(22) Filed: Dec. 14, 2023

(65) Prior Publication Data

US 2024/0113911 A1 Apr. 4, 2024

Related U.S. Application Data

(63) Continuation of application No. PCT/JP2022/024220, filed on Jun. 16, 2022.

(30) Foreign Application Priority Data

Jun. 17, 2021 (JP) ................................ 2021-100923

(51) Int. Cl.
*H04L 12/40* (2006.01)
*H05B 47/18* (2020.01)

(52) U.S. Cl.
CPC ....... *H04L 12/40006* (2013.01); *H05B 47/18* (2020.01); *H04L 2012/40273* (2013.01)

(58) Field of Classification Search
CPC ...... H05B 45/46; H05B 47/155; H05B 47/18; H04L 12/40; H04L 12/40006; H04L 2012/40215; H04L 2012/40247; H04L 2012/40273; B60Q 1/304; B60Q 2900/40
See application file for complete search history.

(56) References Cited

U.S. PATENT DOCUMENTS 9,187,026 B2 * 11/2015 Kurebayashi ............ B60Q 1/04
2016/0297351 A1 * 10/2016 Ichikawa ............... H05B 45/10
2018/0029526 A1 * 2/2018 Matsui ................. B60Q 11/002
2019/0182929 A1 * 6/2019 Nishijima ............... B60Q 1/08
(Continued)

FOREIGN PATENT DOCUMENTS

CN 108136976 A 6/2018
CN 111660957 A 9/2020
(Continued)

OTHER PUBLICATIONS

Extended European Search Report issued on Oct. 28, 2024, in corresponding European Patent Application No. 22825070.0. (11 pages).

(Continued)

*Primary Examiner* — Frank Duong
(74) *Attorney, Agent, or Firm* — Buchanan Ingersoll & Rooney PC

(57) ABSTRACT

A local ECU includes a processor adaptive to execute a software program. An electronic device does not include a processor, and operates under control by the local ECU. The electronic device is structured to store control information required for the local ECU to control the electronic device itself, and to transmit the control information to the local ECU. The local ECU is structured to receive the control information from the electronic device, and to control the electronic device based on the control information.

4 Claims, 8 Drawing Sheets

(56) References Cited

U.S. PATENT DOCUMENTS

| | | | | |
|---|---|---|---|---|
| 2020/0196407 | A1 | 6/2020 | Takeyasu | |
| 2020/0275542 | A1* | 8/2020 | Ichikawa | H05B 45/46 |
| 2021/0039550 | A1* | 2/2021 | Miyashita | B60Q 1/381 |

FOREIGN PATENT DOCUMENTS

| | | | |
|---|---|---|---|
| CN | 112498227 | A | 3/2021 |
| JP | 2013107590 | A | 6/2013 |
| JP | 2020176442 | A | 10/2020 |
| JP | 2021018322 | A | 2/2021 |
| WO | 2018185900 | A1 | 10/2018 |
| WO | 2019208545 | A1 | 10/2019 |

OTHER PUBLICATIONS

International Search Report (PCT/ISA/210) and Written Opinion (PCT/ISA/237) both with English translation mailed on Aug. 23, 2022, by the Japanese Patent Office as the International Searching Authority for International Application No. PCT/JP2022/024220.

Office Action/Search Report (First Notice of Examination) issued on Apr. 21, 2026, in corresponding Chinese Patent Application No. 202280042255.7 and machine English translation of the Office Action/Search Report. (14 pages).

* cited by examiner

VEHICLE CONTROL SYSTEM

BACKGROUND

1. Technical Field

The present disclosure relates to a vehicle control system.

2. Description of the Related Art

An automobile is provided with electronic devices such as headlamps, rear lamps, blinkers, wipers, etc. In recent years, progress is being made in making automotive lamps more sophisticated. This accompanies progress being made in making such electronic devices more sophisticated and having higher added value.

In some cases, a turn lamp (turning signal lamp), which is one of the electronic devices, is configured to support sequential lighting, i.e., is configured to be sequentially turned on so as to form illumination that flows from one end thereof. Patent document 1 (International Publication WO 2019/208545) discloses a technique for mounting a microcontroller within a lamp in order to provide sequential lighting. In this technique, the microcontroller mounted within the lamp calculates and controls the timing and the order of the lighting on/off states of the multiple light-emitting elements.

An automobile is provided with a large number of electronic devices in addition to turn lamps. Accompanying progress being made in making each electronic device more sophisticated, the provision of such a high-performance processor such as a microcontroller or the like to each electronic device leads to an increase in the overall cost of the automobile.

The present inventor has investigated an architecture/platform to be operated under control by a single common controller which is referred to as an Electronic Control Unit (ECU). In this architecture/platform, each electronic device does not include a high-performance processor. With this, each electronic device is controlled by a software program executed by an external ECU. This allows the total number of microcontrollers employed in an automobile to be reduced, which is advantageous from the viewpoint of cost.

As a result of investigating this architecture/platform, the present inventor has recognized the following problems.

The present inventor has investigated this architecture/platform supporting a sequential turn lamp as disclosed in Patent document 1. The sequential turn lamp includes multiple light-emitting elements arranged on a plane, and supports a flowing lighting effect by shifting the lighting timing of each of the multiple light-emitting elements. In this architecture, a higher-level ECU executes a software program so as to generate the lighting on/off timing and the light intensity of each of the multiple light-emitting elements at each time point, etc. (which is referred to as a "lighting pattern"). With this, a control signal that corresponds to the lighting pattern is supplied to the sequential turn lamp.

There is a difference between products in the number of the light-emitting elements that form the sequential turn lamp and the lighting on/off timing. Accordingly, in order to control a given sequential turn lamp, it is necessary to develop or modify the software program for each sequential turn lamp. This means an increased burden on the ECU designer, and means an increase in the development cost.

The information with respect to the lighting pattern may be configured as external data separated from the software program. In this case, the external data may preferably be rewritten for each sequential turn lamp to be controlled. However, in a case in which a given lamp is replaced by another lamp having a different part number, for example, the operator must rewrite the external data of the ECU.

Also, a method is conceivable in which external data is held in the ECU for all conceivable kinds of products of the sequential turn lamps. In this case, the ECU requires nonvolatile memory having an enormous capacity, which becomes a cause of an increased cost.

Description has been made regarding the sequential turn lamp as an example. Also, other kinds of electronic devices have the potential to involve the same problems.

SUMMARY

The present disclosure has been made in view of such a situation. Accordingly, it is an exemplary purpose of an embodiment of the present disclosure to allow an ECU to be designed in a simple manner or with a low cost.

An embodiment of the present disclosure relates to a vehicle control system. The vehicle control system includes: an Electronic Control Unit (ECU) including a processor adaptive to execute a software program; and an electronic device that does not include a processor and that is structured to operate under control by the ECU. The electronic device stores control information required for the ECU to control the electronic device itself, and is structured to transmit the control information to the ECU. The ECU is structured to receive the control information from the electronic device, and to control the electronic device based on the control information.

Another embodiment of the present disclosure relates to an electronic device. The electronic device is structured to operate under control by an Electronic Control Unit (ECU) including a processor. The electronic device includes: nonvolatile memory structured to store control information required for the ECU to control the electronic device; and a function block including a communication circuit structured to communicate with the ECU, and structured to receive a control instruction from the ECU, and to operate according to the control instruction.

Yet another embodiment of the present disclosure relates to an Electronic Control Unit (ECU) structured to control an electronic device. The ECU includes: a first communication circuit structured to communicate with a higher-level controller; a second communication circuit structured to communicate with the electronic device; nonvolatile memory structured to store a software program; and a processor adaptive to execute the software program. The second communication circuit receives from the electronic device control information required to control the electronic device. The processor generates a control instruction for indicating the state of the electronic device. The second communication circuit transmits the control instruction to the electronic device.

It should be noted that any combination of the components described above or any manifestation of the present disclosure may be mutually substituted between a method, apparatus, or the like, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
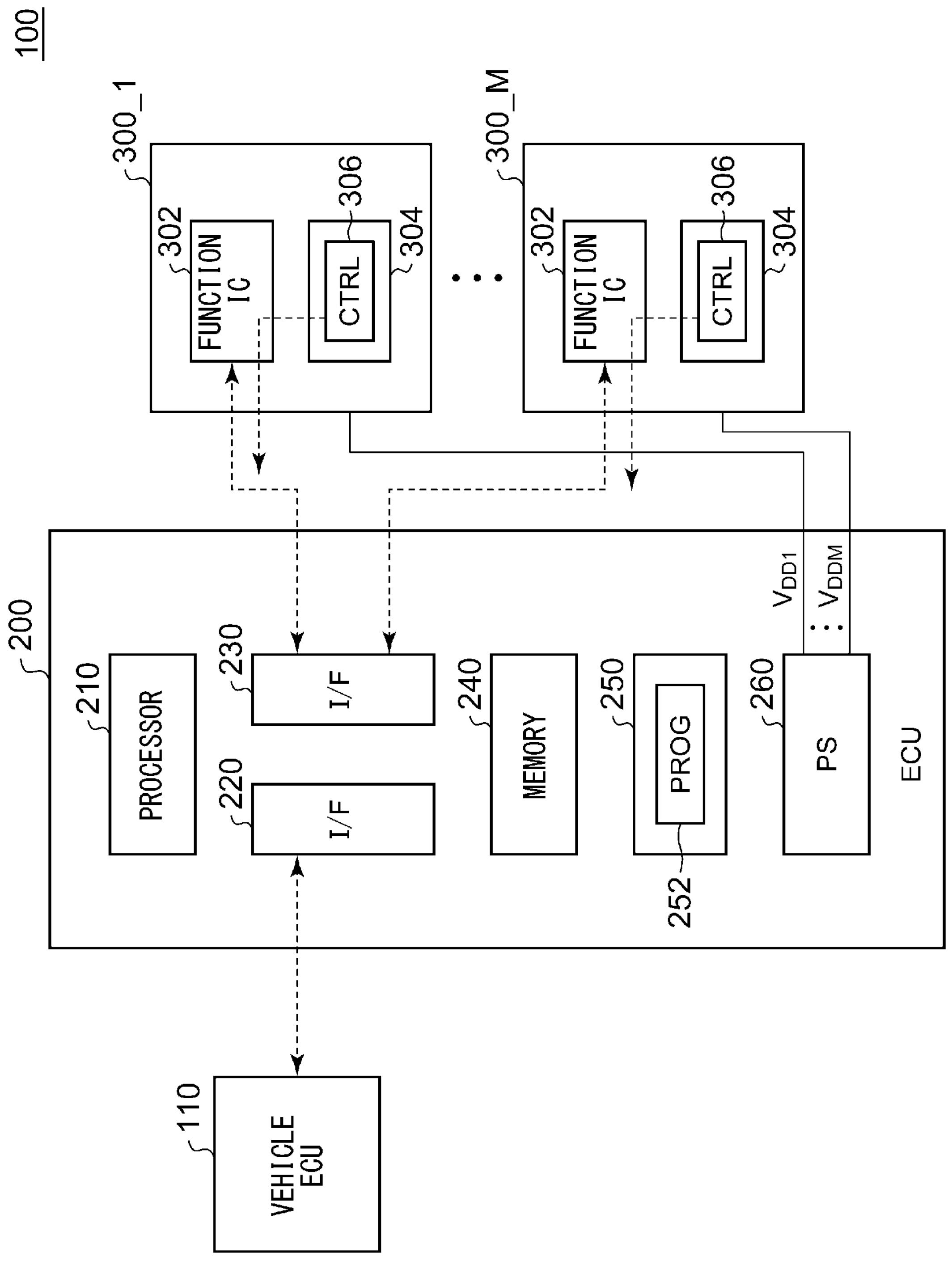
FIG. 1 is a block diagram of a vehicle control system according to an embodiment.

Description will be made regarding the outline of several exemplary embodiments of the present disclosure. The outline is a simplified explanation regarding several concepts of one or multiple embodiments as a preface to the detailed description described later in order to provide a basic understanding of the embodiments. That is to say, the outline described below is by no means intended to restrict the scope of the present invention and the present disclosure. Furthermore, the outline described below is by no means a comprehensive outline of all possible embodiments. That is to say, the outline is by no means intended to identify the indispensable or essential elements of all the embodiments, and is by no means intended to define the scope of a part of or all the embodiments. For convenience, in some cases, an "embodiment" as used in the present specification represents a single or multiple embodiments (examples and modifications) disclosed in the present specification.

A vehicle control system according to one embodiment includes: an Electronic Control Unit (ECU) including a processor adaptive to execute a software program; and an electronic device that does not include a processor and that is structured to operate under control by the ECU. The electronic device is structured to store control information required for the ECU to control the electronic device itself, and is structured to transmit the control information to the ECU. The ECU is structured to receive the control information from the electronic device, and to control the electronic device based on the control information.

The software program for the ECU may preferably be designed giving consideration only to control common to multiple electronic devices with different product numbers. That is to say, it is unnecessary to describe the software program with respect to the control and functions specific to the product number of each electronic device. This allows the ECU to be designed in a simple manner. In other words, the ECU is not required to store specific data for all the product types of the electronic devices, thereby allowing the cost to be reduced.

In one embodiment, the electronic device may be structured to process including a temporal element. Also, the control information may include time-series data.

In one embodiment, the electronic device may be configured as a lamp including multiple light-emitting elements. Also, the electronic device may store a lighting pattern of the multiple light-emitting elements as the control information. With such an arrangement, in a case in which the lighting on/off timing is controlled for the multiple light-emitting elements so as to provide an animated display, it is unnecessary to prepare the required lighting pattern in the ECU in the ECU design stage.

In one embodiment, when the ECU and the electronic device are first coupled, the control information may be transmitted from the electronic device to the ECU. It is wasteful to transmit the control information from the electronic device to the ECU every time the ignition of the vehicle is turned on. In order to solve such a problem, the control information is transmitted only for the first time coupling is made. Such an arrangement prevents wasteful operation.

An electronic device according to one embodiment is structured to operate under control by an Electronic Control Unit (ECU) including a processor. The electronic device includes: nonvolatile memory structured to store control information required for the ECU to control the electronic device; and a function block including a communication circuit structured to communicate with the ECU, and structured to receive a control instruction from the ECU, and to operate according to the control instruction.

Also, the electronic device may be structured as a lamp. Also, the function block may include: multiple light-emitting elements; and a lighting circuit including the communication circuit, and structured to individually turn on the multiple light-emitting elements.

An ECU according to one embodiment is structured to control an electronic device. The ECU includes: a first communication circuit structured to communicate with a higher-level controller; a second communication circuit structured to communicate with the electronic device; nonvolatile memory structured to store a software program; and a processor adaptive to execute the software program. The second communication circuit receives from the electronic device control information required to control the electronic device. The processor generates a control instruction for indicating the state of the electronic device. The second communication circuit transmits the control instruction to the electronic device.

Embodiments

Description will be made below regarding preferred embodiments with reference to the drawings. In each drawing, the same or similar components, members, and processes are denoted by the same reference numerals, and redundant description thereof will be omitted as appropriate. The embodiments have been described for exemplary purposes only, and are by no means intended to restrict the present disclosure and the present invention. Also, it is not necessarily essential for the present disclosure and the present invention that all the features or a combination thereof be provided as described in the embodiments.

FIG. 1 is a block diagram of a vehicle control system 100 according to an embodiment. The vehicle control system 100 is a part of an automobile. The position and the functions thereof are not restricted.

The vehicle control system 100 includes a vehicle ECU 110, a local ECU 200, and one or multiple electronic devices 300.

The vehicle ECU 110 is configured as a controller that integrally controls the overall operation or a part of the operation of the vehicle. Also, the vehicle ECU 110 may be a controller that is also referred to as a Body Control Module (BCM). The local ECU 200 controls a part of the multiple electronic devices that form the vehicle, i.e., electronic devices 300_1 through 300_N. The electronic devices 300_1 through 300_N are each configured to be capable of communicating with the local ECU 200, and to operate according to control from the local ECU 200.

The multiple electronic devices 300_1 through 300_M to be coupled to the local ECU 200 may relate to the same function. For example, the local ECU 200 may be a lamp ECU that supports control relating to the lamp. Also, the electronic devices 300_1 through 300_M may each be configured as a lamp. For example, the electronic device 300_1 may be a left rear lamp, and the electronic device 3002 may be a right rear lamp. In a case in which the left and right rear lamps are each divided into multiple housings (e.g., the vehicle side and the trunk lid side), the electronic devices 300_1, 300_2, 300_3, and 300_4 may be a left body-side rear lamp, left trunk-lid-side rear lamp, right body-side rear lamp, and right trunk-lid-side rear lamp, respectively.

The multiple electronic devices 300_1 through 300_M to be coupled to the local ECU 200 may relate to different functions. For example, the local ECU 200 may be configured as an integral ECU that integrally supports the control relating to lamps, sensors, wipers, etc. Also, the electronic devices 300_1 through 300_M may be configured as lamps, sensors, or wipers.

In FIG. 1, the broken lines indicate signal lines relating to control. The solid lines indicate lines relating to the power supply.

The local ECU 200 includes a processor 210, a communication circuit 220, a communication circuit 230, memory 240, nonvolatile memory 250, and a power supply circuit 260. The processor 210 executes a software program 252 stored in the nonvolatile memory 250, and controls the multiple electronic devices 300_1 through 300_M under its control according to a control instruction from the vehicle ECU 110.

The software program 252 supports the following functions.

- A communication function for communicating with the vehicle ECU 110
- Selection of the function (operation mode) of each of the multiple electronic devices 300
- Control of the operating state of the multiple electronic devices 300

The communication circuit 220 is an interface configured to communicate with the vehicle ECU 110. The kind of the interface is not restricted in particular. The communication circuit 220 may be configured as a vehicle bus such as a Controller Area Network (CAN), Local Interconnect Network (LIN), or the like.

The communication circuit 230 is an interface configured to communicate with each electronic device 300. The kind of the interface is not restricted in particular. The communication circuit 230 may be configured as a serial interface such as an Inter IC ($I^2C$), Serial Peripheral Interface (SPI), or the like. Also, the communication circuit 230 may be configured as a uniquely designed non-standardized interface. Also, the communication circuit 230 may be configured as a vehicle bus.

The memory 240 stores the program 252 to be executed by the processor 210. Furthermore, the memory 240 stores data generated by the processor 210.

The nonvolatile memory 250 stores the program 252 to be executed by the processor 210 and initial setting values necessary for the operation of the local ECU 200.

The power supply circuit 260 supplies the power supply voltage to the electronic devices 300_1 through 300M. The power supply circuit 260 may be configured as a stabilized power supply, or simply as wiring or a switch that diverts the battery voltage.

The processor 210, the communication circuit 220, the communication circuit 230, memory 240, and nonvolatile memory 250, which are each a component of the local ECU 200, may be monolithically formed as a microcontroller or a System On Chip (SoC). Also, such components may each be configured as a separate component.

The electronic devices 300_1 through 300_M each do not include a processor that is capable of executing a software program. That is to say, each electronic device 300 is configured as a hardware component alone. In order to operate such an electronic device (which will be referred to as a "passive electronic device" hereafter) 300, an instruction to control the operating sequence of the passive electronic device 300 is written in a program 252 to be executed by the processor 210 of the local ECU 200. With this, the processor 210 controls the operation of the passive electronic devices 300. Each passive electronic device 300 operates in a passive manner under control of the local ECU 200.

Each electronic device 300 is configured to be capable of communicating with the communication circuit 230 of the local ECU 200. Each electronic device 300 receives a control instruction from the local ECU 200, and operates according to the control instruction.

Each electronic device 300 stores necessary control information 306 in order to allow the local ECU 200 to control the electronic device 300 itself, i.e., in order to allow the local ECU 200 to generate a control instruction. Before the start of the operation of the automotive control system 100, each electronic device 300 is capable of transmitting the control information 306 to the local ECU 200. The local ECU 200 receives the control information 306 from the electronic device 300. Subsequently, the local ECU 200 generates the control instruction based on the control information 306 while executing the software program 252, thereby controlling the electronic device 300.

The electronic device 300 includes at least one function IC (Integrated Circuit) 302 and nonvolatile memory 304. The nonvolatile memory 304 stores the control information 306. The function IC 302 operates based on the control instruction received from the local ECU 200. A communication circuit (interface) between the electronic device 300 and the local ECU 200 may be built into the function IC 302, or may be configured as a separate chip from the function IC 302.

For example, each electronic device 300 is capable of executing processing including a temporal element. In this case, the control information 306 may include time-series data.

For example, in a case in which the electronic device 300 is a lamp, examples of processing including such a temporal element include: an animated display by turning on and off the multiple light-emitting elements; an animated display by controlling a patterning device (light modulator); an animated display by scanning a beam; etc. In this case, the time-series data represents the state of each function IC 302 at multiple time points elapsed from the start of the animated display.

In a case in which the electronic device 300 is an active sensor, examples of processing including such a temporal element include: a light-emitting timing and light-emitting period of an illumination apparatus; a sensing timing (exposure timing) and detection period (exposure period) of a light-receiving element; etc. The above is the overall configuration of the vehicle control system 100.

With the vehicle control system 100, the software program 252 for the local ECU 200 may preferably be designed giving consideration to only common control for multiple electronic devices having different part numbers. That is to say, the software program is not required to have information with respect to the control and functions that are specific to the part number of each electronic device. This allows the ECU to be designed in a simple manner.

Furthermore, the local ECU 200 is not required to store specific data (control information) for all the product kinds of the electronic device 300. This allows the capacity and cost of the nonvolatile memory 250 to be reduced.

The present disclosure encompasses various kinds of apparatuses and methods that can be regarded as a block configuration or a circuit configuration shown in FIG. 1, or otherwise that can be derived from the aforementioned description. That is to say, the present disclosure is not restricted to a specific configuration. More specific description will be made below regarding example configurations or examples for clarification and ease of understanding of the essence of the present disclosure and the present invention and the operation thereof. That is to say, the following description will by no means be intended to restrict the technical scope of the present disclosure.

Description will be made regarding an application in a case in which the electronic device 300 is a lamp, and more specifically, a rear lamp.

Figure 2:
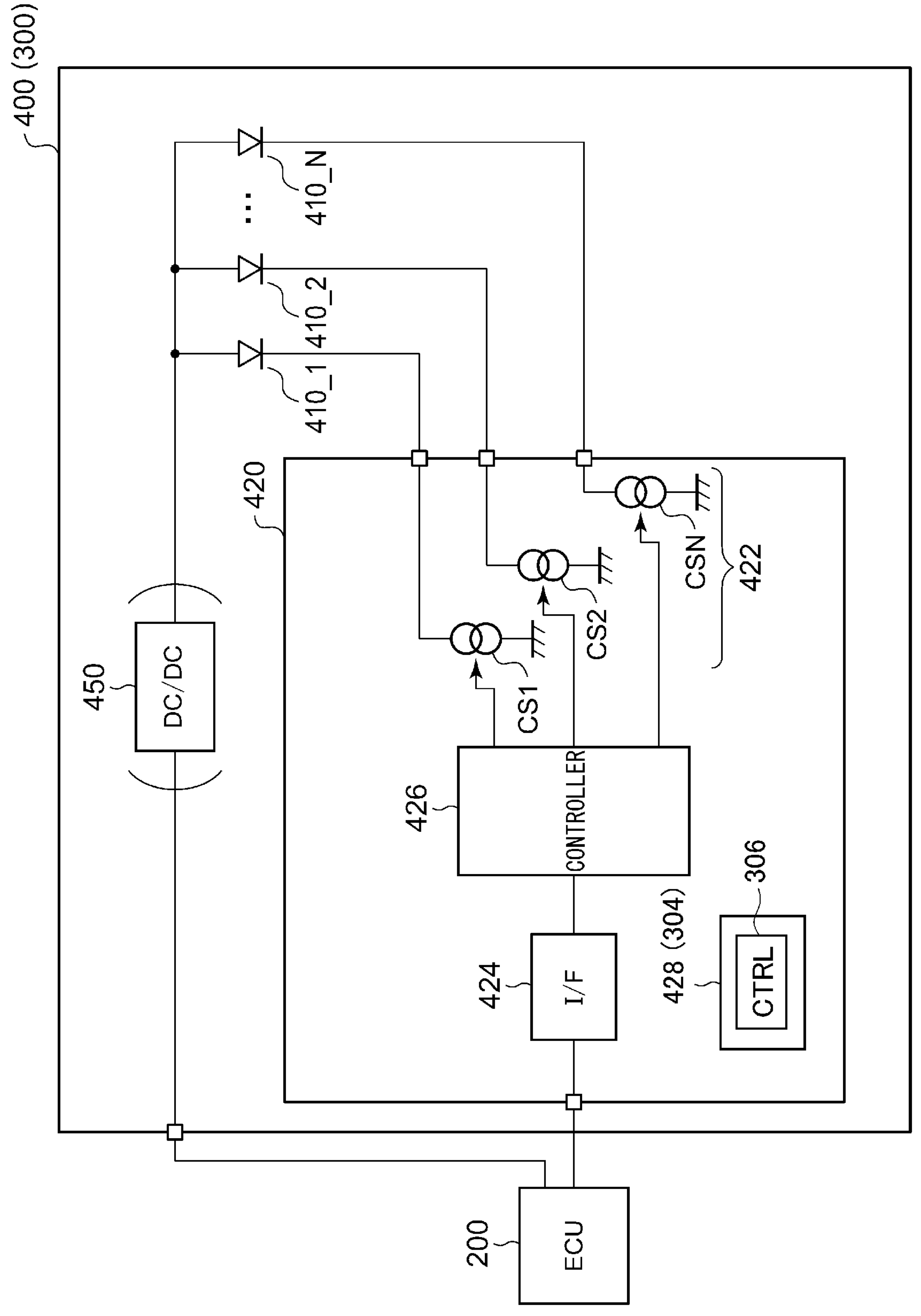
FIG. 2 is a diagram showing a rear lamp configured as an example of an electronic device.

FIG. 2 is a diagram showing a rear lamp 400 which is an example of the electronic device 300.

The rear lamp 400 includes multiple light-emitting elements 410_1 through 410_N and a driver IC (Integrated Circuit) 420. That is to say, the rear lamp 400 is configured as a passive electronic device without a processor (microcontroller). The rear lamp 400 may be configured as any one of a brake lamp, stop lamp, tail lamp, and turn signal lamp. Also, the rear lamp 400 may be a rear combination lamp configured as an integrated lamp that incorporates these functions.

The multiple light-emitting elements 410_1 through 410_N are each configured as a semiconductor light-emitting element such as a light-emitting diode (LED), organic EL element, laser diode, etc., that supports the color that corresponds to the kind of the lamp. A single light-emitting element 410 may include multiple LEDs coupled in series.

The driver IC 420 is configured as a function IC (Integrated Circuit) that is capable of individually controlling the light intensity and the lighting on/off state of each of the multiple light-emitting elements 410_1 through 410_N.

The driver IC 420 includes a lighting circuit 422, a communication circuit 424, a controller 426, and nonvolatile memory 428. The lighting circuit 422 includes multiple current sources CS1 through CSN that supply driving currents to the multiple light-emitting elements 410_1 through 410_N.

The rear lamp 400 may further include a power supply circuit 450. The power supply circuit 450 is configured as a DC/DC converter, for example. The power supply circuit 450 steps down or steps up the power supply voltage $V_{DD}$ supplied from the local ECU 200, so as to convert the power supply voltage $V_{DD}$ into a voltage level suitable for the light-emitting elements 410 that function as a load. It should be noted that the power supply circuit 450 may be omitted.

The communication circuit 424 is an interface that is capable of communicating with the communication circuit 230 of the local ECU 200. The communication circuit 424 receives a control instruction including a lighting-on instruction or lighting-off instruction, light intensity information, etc., with respect to the multiple light-emitting elements 410_1 through 410_N from the local ECU 200. The controller 426 controls the multiple current sources CS1 through CSN based on the control instruction received by the communication circuit 424.

The nonvolatile memory 428 corresponds to the nonvolatile memory 304 shown in FIG. 1, and stores the control information 306. The nonvolatile memory 428 may be integrated in the driver IC 420. Also, the nonvolatile memory 428 may be configured as an external component of the driver IC 420.

Description will be made in the present example regarding an arrangement in which the multiple light-emitting elements 410_1 through 410_N are each configured as a red LED, and are arranged in a row extending in the horizontal direction, so as to form a stop lamp. In normal traveling, when the brake pedal is depressed, the stop lamp is turned on. Accordingly, when the brake pedal is depressed, the vehicle ECU 110 instructs the local ECU 200 to turn on the stop lamp. The local ECU 200 executes an instruction of the program that corresponds to the turn-on instruction. As a result, a control instruction is input to the communication circuit 424 so as to turn on the multiple current sources CS1 through CSN at substantially the same time. According to the control instruction, the multiple light-emitting elements 410_1 through 410_N are turned on at the same time.

In recent years, a display using an automotive lamp has become a trend. For example, the multiple light-emitting elements 410_1 through 410_N are turned on according to a predetermined sequence (animated lighting) in response to unlocking or locking a door, turning on the ignition, or the like. It should be noted that no microcontroller is mounted in the rear lamp 400 itself. Accordingly, the processing with respect to the animated lighting is written to the software program to be executed by the local ECU 200.

Figure 3:
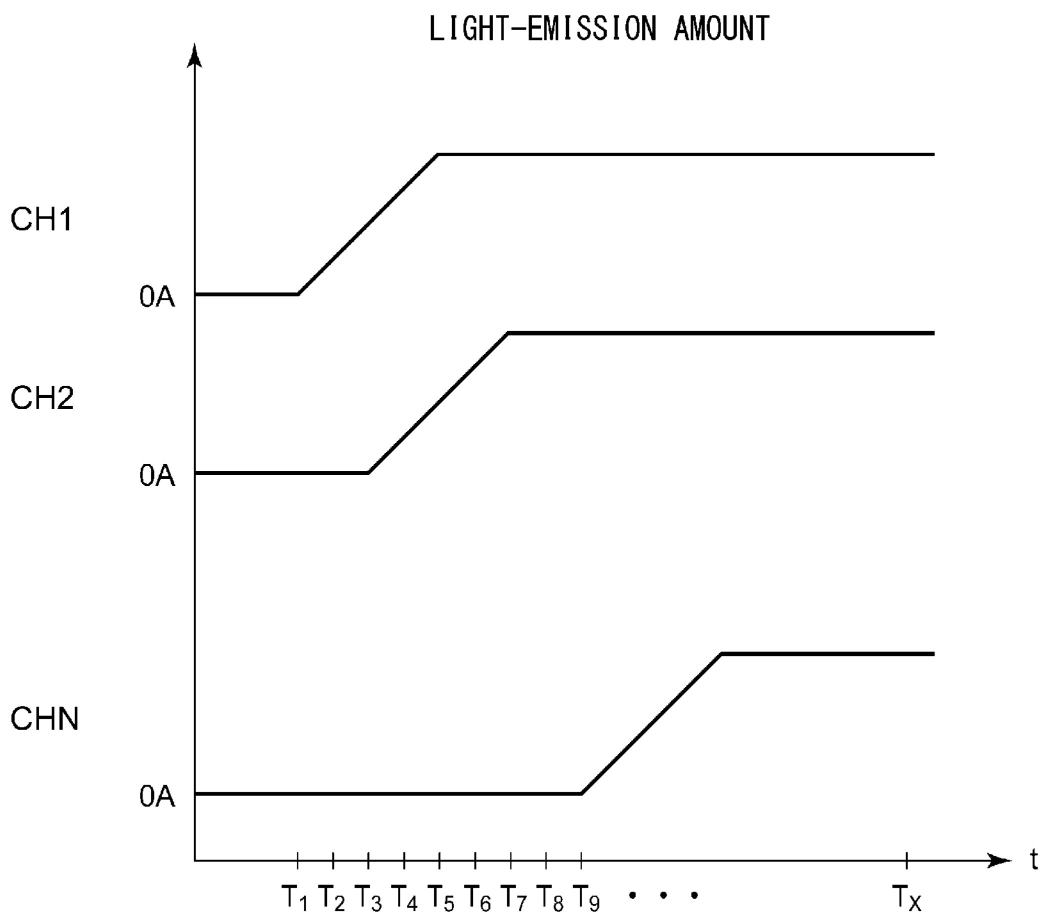
FIG. 3 is a waveform diagram showing an example of animated lighting.

FIG. 3 is a waveform diagram showing an example of the animated lighting. In this example, the multiple light-emitting elements 410_1 through 410_N that correspond to the multiple channels CH1 through CHN are sequentially turned on.

In order to provide animated lighting, this operation requires the lighting order and lighting timing of the multiple light-emitting elements 410_1 through 410_N. The control information 306 is time-series data that indicates the lighting order and the lighting timing. That is to say, the control information 306 includes a light-emission amount (light intensity) of each of the multiple light-emitting elements 410_1 through 410_N at the time points $T_1$ through $T_x$ shown in FIG. 3.

Figure 4:
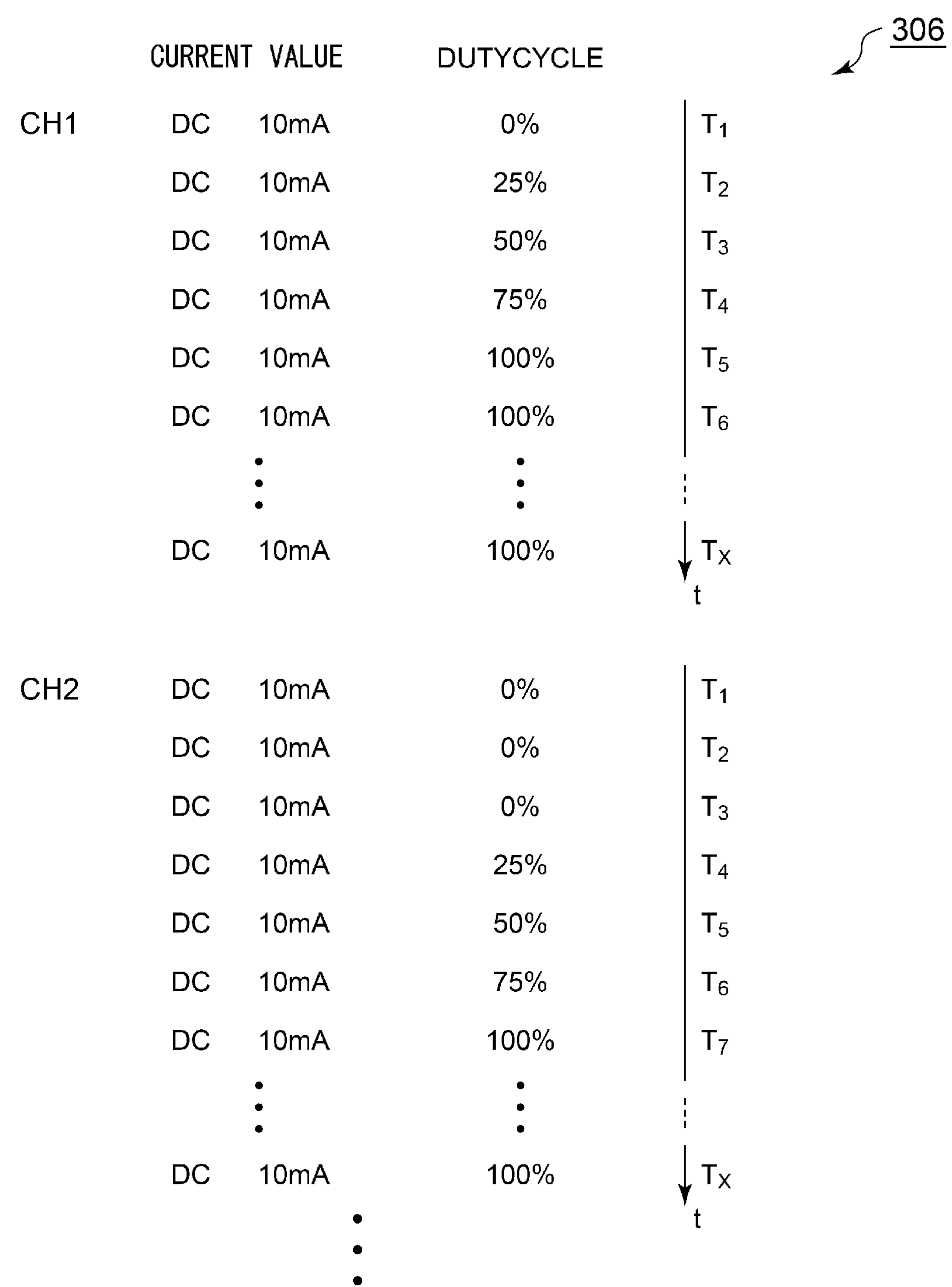
FIG. 4 is a diagram showing an example of control information.

FIG. 4 is a diagram showing an example of the control information 306. Description will be made assuming that the driver IC 420 controls the light intensity of each of the multiple light-emitting elements 410 by PWM (pulse width modulation) dimming. The control information 306 may include the DC current value and the duty cycle of the PWM operation at the time points $T_1$ through $T_N$. FIG. 4 shows the data of two channels CH1 and CH2. Similar data is prepared for the other channels CH3 through CHN.

The local ECU 200 generates a control instruction using the control information 306. The following functions and processing are provided by the software program 252 used by the local ECU 200.

Function of communication with the vehicle ECU 110 (S100)

Selection of a function (operation mode) of the rear lamp 400 (S102)

For example, in a case in which the rear lamp 400 is configured to be capable of providing three light-emission modes, i.e., a stop lamp, a tail lamp, and animated lighting, the local ECU 200 selects one mode according to an instruction from the vehicle ECU 110.

Selection of a light source to be turned on (S104)

The light-emitting element to be turned on is selected from among the multiple light-emitting elements 410 in the selected function (operation mode).

Generation of a lighting pattern (S106)

The state of each light-emitting element (i.e., on, off, duty cycle, and DC current value) is generated at each time point.

Transmission of the control instruction (S108)

The duty cycle at each time point is transmitted to the rear lamp.

The control information 306 received from the rear lamp 400 is referenced with respect to the step S104 for selecting the light source to be turned on and the step S106 for generating the lighting pattern. With this, the local ECU 200 is able to generate a lighting pattern suitable for the rear lamp 400 after it is coupled to the rear lamp 400 regardless of the part number thereof.

Figure 5:
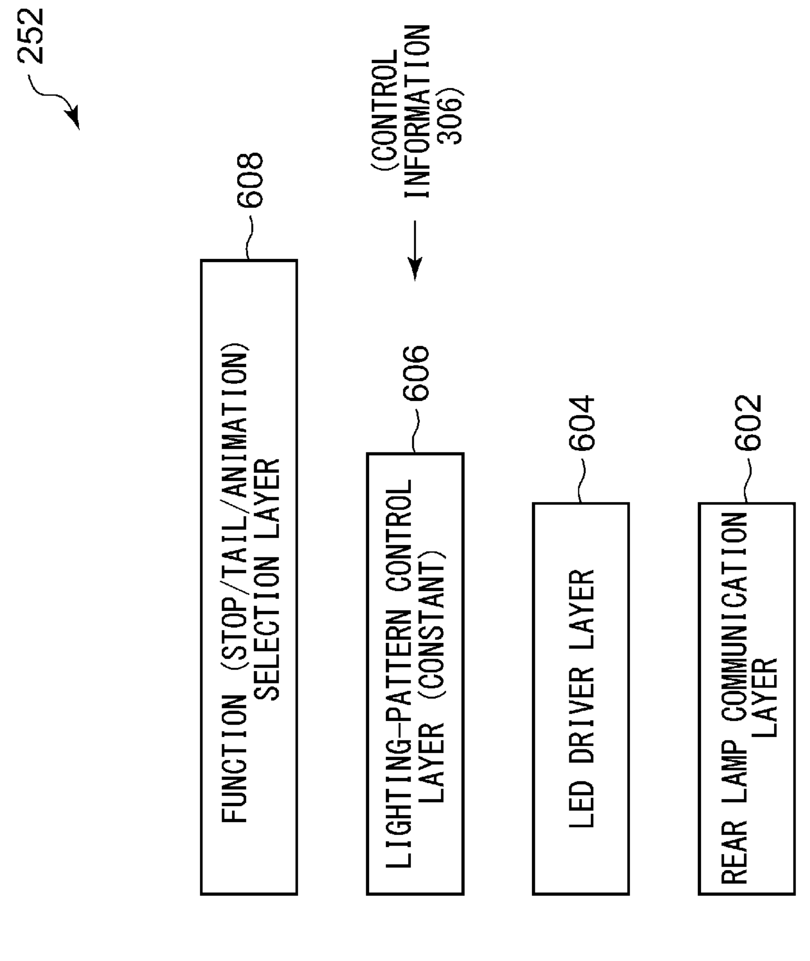
FIG. 5 is a diagram showing a hierarchical structure of a software program.

FIG. 5 is a diagram showing a hierarchical structure of the software program 252. The left side shows a part relating to the vehicle ECU 110, and the right side shows a part relating to the rear lamp 400 (electronic device 300).

The software program 252 includes a vehicle communication layer 600, a rear lamp communication layer 602, an LED driver layer 604, a lighting pattern control layer 606, and a function selection layer 608.

The vehicle communication layer 600 corresponds to the function S100 described above. The rear lamp communication layer 602 corresponds to the function S108 described above. The function selection layer 608 corresponds to the function 102 described above. The LED driver layer 604 controls the driver IC 420. The lighting pattern control layer 606 corresponds to the function S106, and generates the lighting pattern and the control instruction.

The control information 306 is referenced by the lighting pattern control layer 606. Alternatively, a part of the program of the lighting pattern control layer 606 is rewritten according to the control information 306.

It should be noted that the driver IC 420 mounted in the rear lamp 400 is provided by various kinds of IC manufacturers (chip vendors). In some cases, there is a difference in the communication protocol and the dimming control method between ICs. In this case, the control information 306 may include information that describes the communication protocol and the dimming control method specific to the driver IC 420.

For example, in some cases, the driver IC 420 is configured to require the light intensity information for each light-emitting element 410 as a duty cycle. In some cases, the driver IC 420 is configured to require the light intensity information for each light-emitting element 410 as current value information. In such a case, by rewriting the driver layer 604 according to the control information 306, such an arrangement is capable of supporting each rear lamp 400 although it includes a different driver IC 420.

It is wasteful to transmit the control information 306 every time the vehicle is started up. In order to solve such a problem, when the local ECU 200 is coupled to the rear lamp 400 (electronic device 300) for the first time, the control information 306 is transmitted to the local ECU 200 from the electronic device 300.

Figure 6:
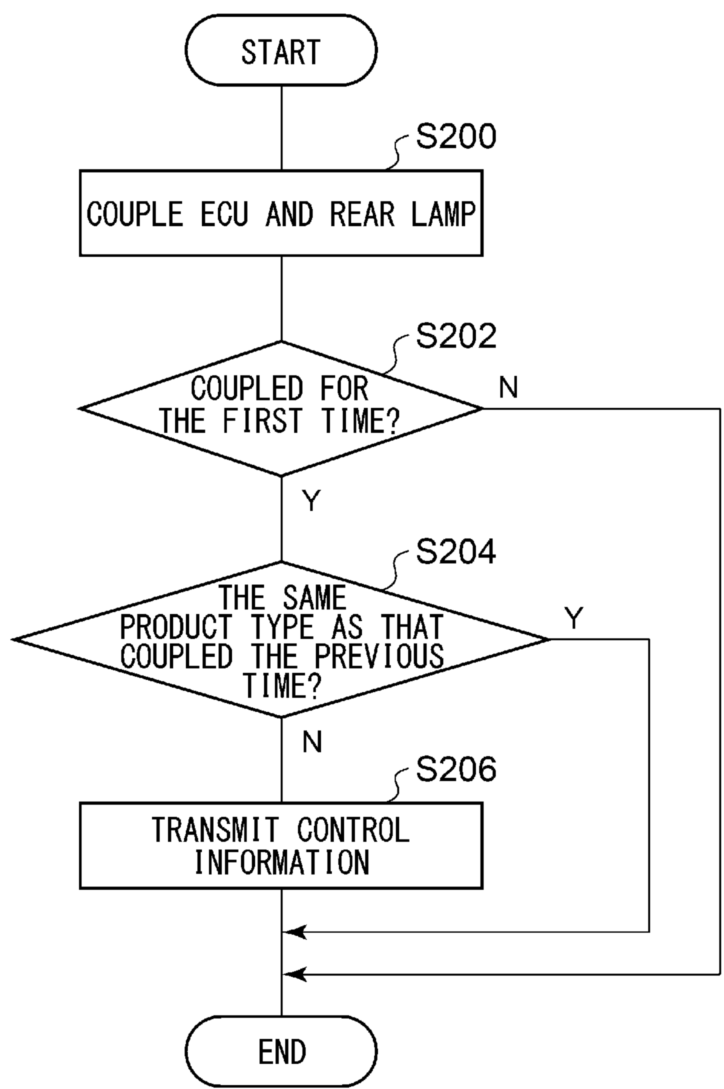
FIG. 6 is a flowchart for explaining transmission of the control information.

FIG. 6 is a flowchart for explaining the transmission of the control information. After the power supply of the vehicle is turned on (the ignition is turned on), a link is established between the local ECU 200 and the rear lamp 400 (S200).

Subsequently, judgment is made regarding whether or not the coupling between the local ECU 200 and the rear lamp 400 is made for the first time (S202). In a case in which the coupling is not made for the first time (S202), the processing ends without transmitting the control information 306.

In a case in which judgment has been made that the coupling is made for the first time, judgment is made regarding whether or not the lamp coupled for the first time is the same product type as that coupled the previous time (S204). In a case in which judgment has been made that the lamp is the same type (YES in S204), the processing ends without transmitting the control information 306.

In a case in which the lamp is not the same type (NO in S204), the control information 306 is transmitted (S206).

With this processing, in a case in which the ECU has been coupled to the lamp for the first time when the vehicle is manufactured, the control information 306 is transmitted.

In a case in which the lamp is temporarily detached for maintenance, and subsequently, the lamp thus detached is mounted, or in a case in which the lamp is replaced with a new lamp of the same product type due to a malfunction of the lamp, the control information 306 is not transmitted because, although the lamp is coupled for the first time, the lamp is the same product type as the previous lamp.

In a case in which a new lamp of a different product type has been attached due to upgrading of the lamp, this means that it is coupled for the first time. Since a lamp of a different product type from the lamp coupled the previous time is coupled, the control information 306 is transmitted.

Figures 7A, 7B:
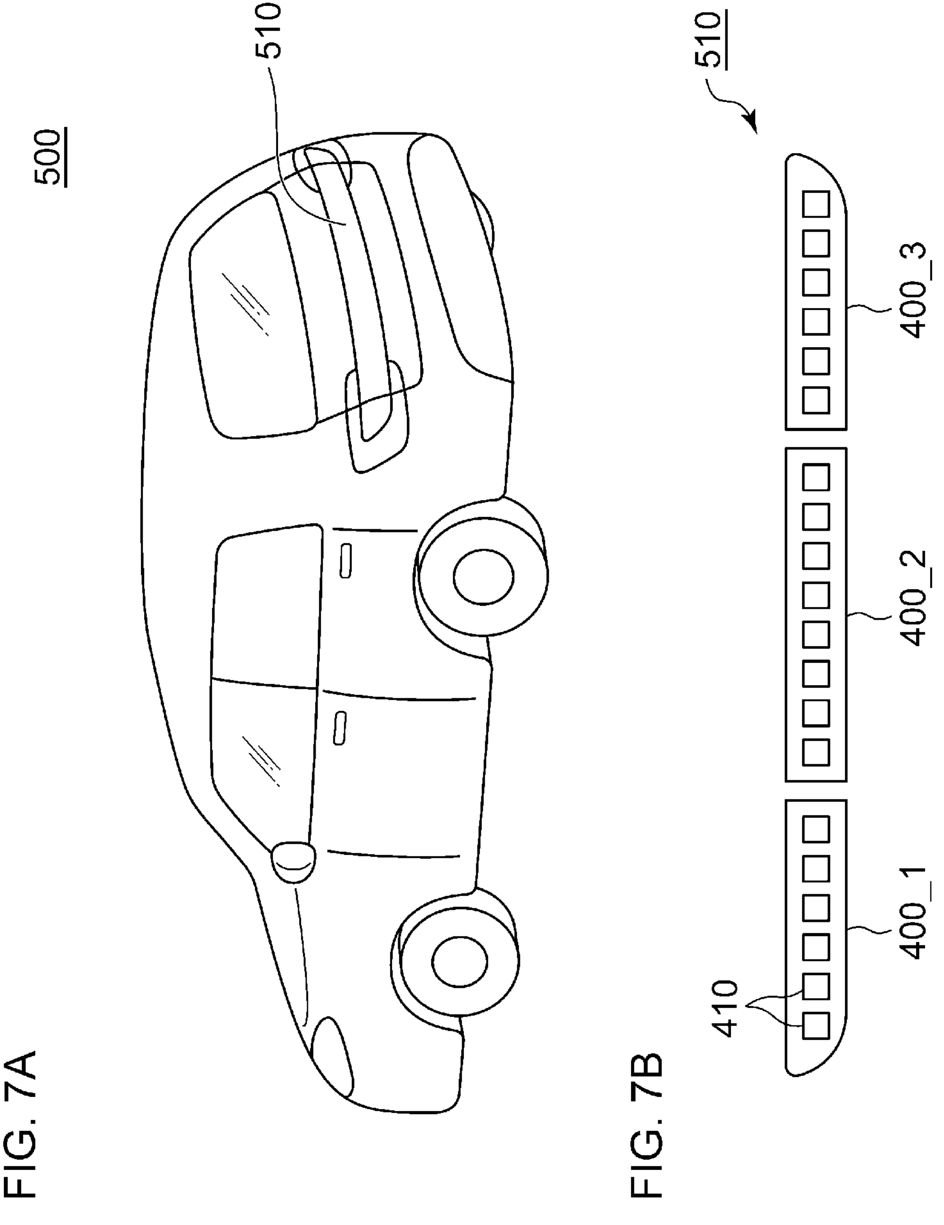
FIG. 7A is a diagram showing an external view of an automobile.
FIG. 7B is a diagram showing a rear lamp.

FIG. 7A is a diagram showing an external view of an automobile 500. FIG. 7B is a diagram showing a rear lamp. The automobile 500 includes a rear lamp 510 extending in the horizontal direction. As shown in FIG. 7B, the rear lamp 510 is formed of multiple divided components 400_1 through 400_3 each configured to have an individual housing. In this case, the components 400_1 through 400_3 are each configured as an electronic device 300. In this example, the left rear lamp 400_1 includes six light-emitting elements. The central rear lamp 400_2 includes eight light-emitting elements. The right rear lamp 400_3 includes six light-emitting elements.

Figure 8:
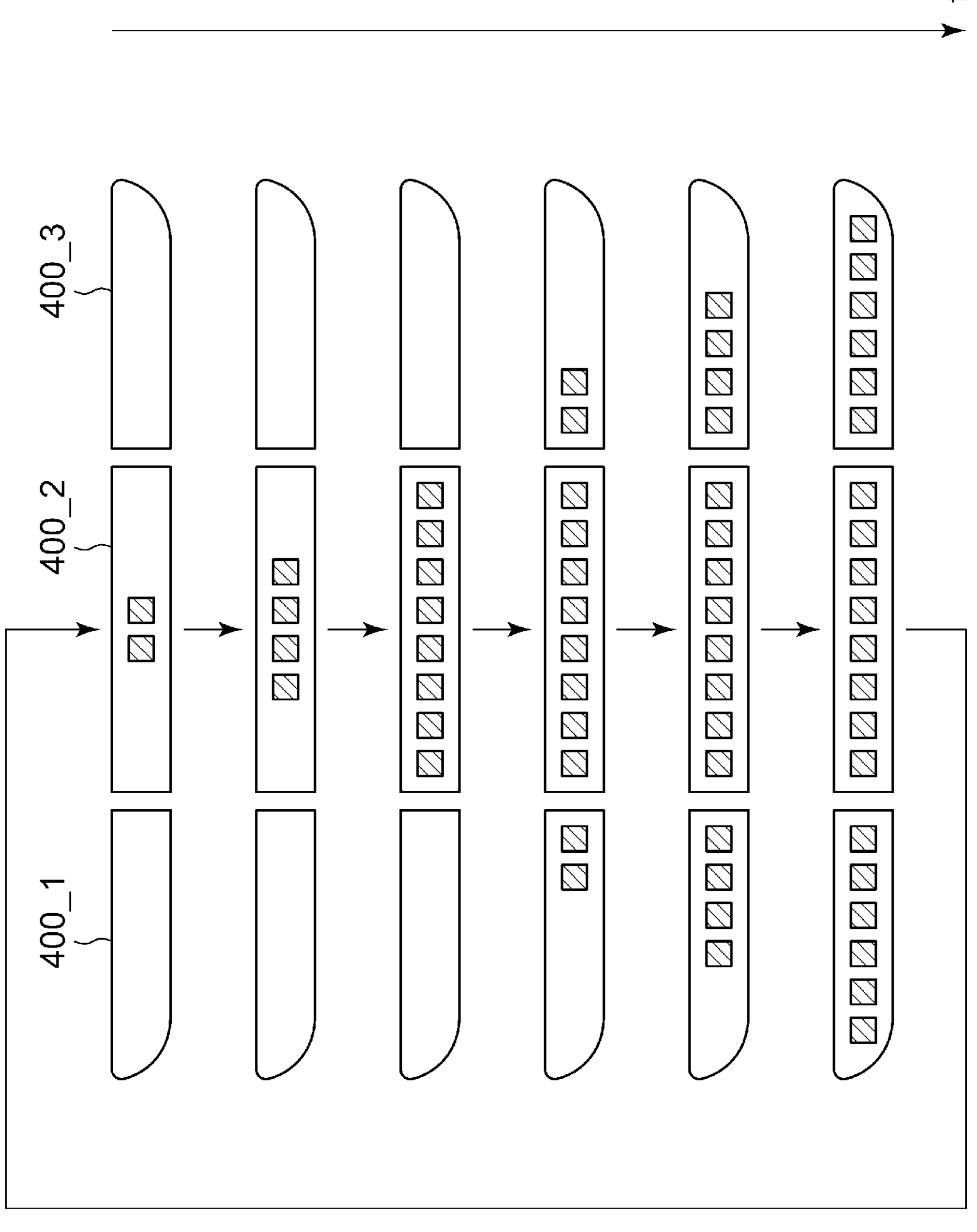
FIG. 8 is a diagram showing an example of an animated display provided by the rear lamp shown in FIG. 7.

In this case, a control operation is performed over all the components of the rear lamp 510, i.e., the multiple rear lamps 400_1 through 400_3. FIG. 8 is a diagram showing an example of an animated display provided by the rear lamp 510 shown in FIG. 7. In this example, each light-emitting element is sequentially turned on from the central light-emitting element 410 toward the outer-side light-emitting elements 410.

The rear lamps 400_1 through 400_3 each have their own control information. Accordingly, this is capable of controlling an animated display over the multiple lamps as shown in FIG. 8 based on the control information received from the rear lamps 400_1 through 400_3.

In another example, the multiple light-emitting elements 410_1 through 410_N may be configured as amber LEDs arranged in a row in the horizontal direction, so as to form a turn signal lamp.

MODIFICATION

The above-described embodiments have been described for exemplary purposes only. Rather, it can be readily conceived by those skilled in this art that various modifications may be made by making various combinations of the aforementioned components or processes. Description will be made below regarding such modifications.

Description has been made with reference to FIG. 2 regarding the rear lamp 400 as an example of the electronic device 300. However, the present invention is not restricted to such an arrangement. Examples of the electronic device 300 include a wiper, back door opener, seat heater, glass hatch, rear-window defogger, rearview camera, rearview camera sensor cleaner, de-icing heater, fuel lid motor, rear door lock motor, power window, and sensors such as millimeter-wave radar or the like. In a case in which the electronic device 300 is configured as a wiper, for example, the cycle of intermittent operation may be defined as the control information.

The embodiments have been described for exemplary purposes only. Rather, it can be readily conceived by those skilled in this art that various modifications may be made by making various combinations of the aforementioned components or processes, which are also encompassed in the technical scope of the present disclosure or the present invention.

What is claimed is:

1. A vehicle control system comprising:

an Electronic Control Unit (ECU); and a lamp including a plurality of light-emitting elements and a driver integrated circuit (driver IC), wherein the ECU comprises:

nonvolatile memory structured to store a software program;

a processor adaptive to execute the software program stored in the nonvolatile memory;

a first communication circuit structured to receive an instruction of animated lighting from vehicle side; and a second communication circuit structured to communicate with the driver IC, wherein the driver IC comprises:

nonvolatile memory structured to store control information including time-series data indicating the lighting sequence and lighting timing of the plurality of light-emitting elements during animated lighting;

a third communication circuit structured to transmit the control information to the second communication circuit, and to receive a lighting instruction from the second communication circuit; and a lighting circuit structured to drive the plurality of light-emitting elements according to the lighting instruction;

wherein, in the ECU, when the first communication circuit receives the instruction of the animated lighting from the vehicle side, the processor generates brightness setting values of the plurality of light-emitting elements at each time based on the control information, and the second communication circuit transmits the lighting instruction including the brightness setting values of the plurality of light-emitting elements to the driver IC, and wherein, in the driver IC, when the third communication circuit receives the lighting instruction, the lighting circuit supplies driving currents to the plurality of light-emitting elements according to the command values of brightness included in the control information received by the third communication circuit.

2. The vehicle control system according to claim 1, wherein, when the ECU and the lamp are first coupled, the third communication circuit transmits the control information to the second communication circuit.

3. A lamp structured to operate under control by an Electronic Control Unit (ECU), the lamp comprising:

a plurality of light-emitting elements; and and a driver integrated circuit (IC), wherein the ECU comprises:

nonvolatile memory structured to store a software program;

a processor adaptive to execute the software program stored in the nonvolatile memory;

a first communication circuit structured to receive an instruction of animated lighting from vehicle side; and a second communication circuit structured to communicate with the driver IC, wherein the driver IC comprises:

nonvolatile memory structured to store control information including time-series data indicating the lighting sequence and lighting timing of the plurality of light-emitting elements during animated lighting;

a third communication circuit structured to transmit the control information to the second communication circuit, and to receive a lighting instruction from the second communication circuit; and a lighting circuit structured to drive the plurality of light-emitting elements according to the lighting instruction;

wherein, in the ECU, when the first communication circuit receives the instruction of the animated lighting from the vehicle side, the processor generates brightness setting values of the plurality of light-emitting elements at each time based on the control information, and the second communication circuit transmits the lighting instruction including the brightness setting values of the plurality of light-emitting elements to the driver IC, and wherein, in the driver IC, when the third communication circuit receives the lighting instruction, the lighting circuit supplies driving currents to the plurality of light-emitting elements according to the command values of brightness included in the control information received by the third communication circuit.

4. An Electronic Control Unit (ECU) structured to control a lamp including a plurality of light-emitting elements and a driver integrated circuit (driver IC), the ECU comprising:

nonvolatile memory structured to store a software program;

a processor adaptive to execute the software program stored in the nonvolatile memory;

a first communication circuit structured to receive an instruction of animated lighting from vehicle side; and a second communication circuit structured to communicate with the driver IC, wherein the driver IC comprises:

nonvolatile memory structured to store control information including time-series data indicating the lighting sequence and lighting timing of the plurality of light-emitting elements during animated lighting;

a third communication circuit structured to transmit the control information to the second communication circuit, and to receive a lighting instruction from the second communication circuit; and a lighting circuit structured to drive the plurality of light-emitting elements according to the lighting instruction;

wherein, in the ECU, when the first communication circuit receives the instruction of the animated lighting from the vehicle side, the processor generates brightness setting values of the plurality of light-emitting elements at each time based on the control information, and the second communication circuit transmits the lighting instruction including the brightness setting values of the plurality of light-emitting elements to the driver IC, and wherein, in the driver IC, when the third communication circuit receives the lighting instruction, the lighting circuit supplies driving currents to the plurality of light-emitting elements according to the command values of brightness included in the control information received by the third communication circuit.

* * * * *